Dec. 4, 1951     C. E. WRIGHT ET AL     2,577,597
DENTAL FLOSS HOLDER
Filed May 3, 1948                                2 SHEETS—SHEET 2
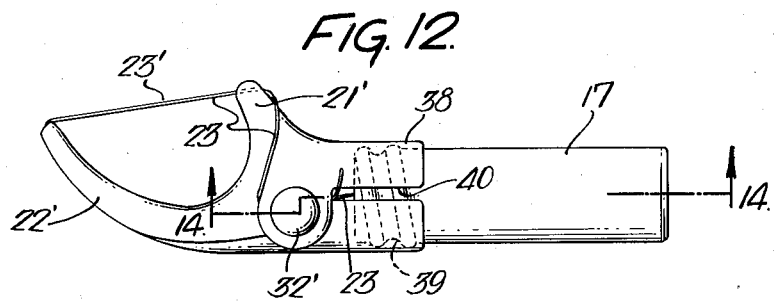
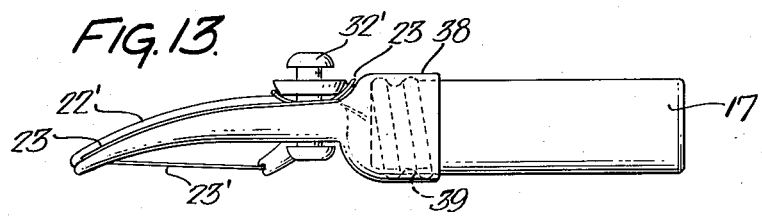
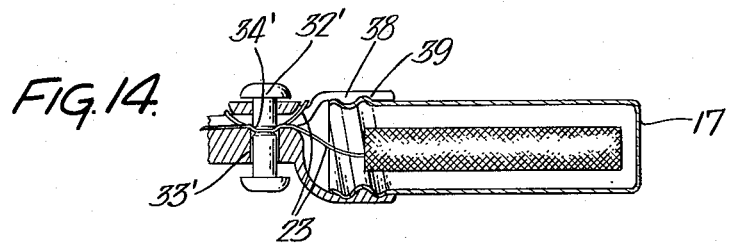
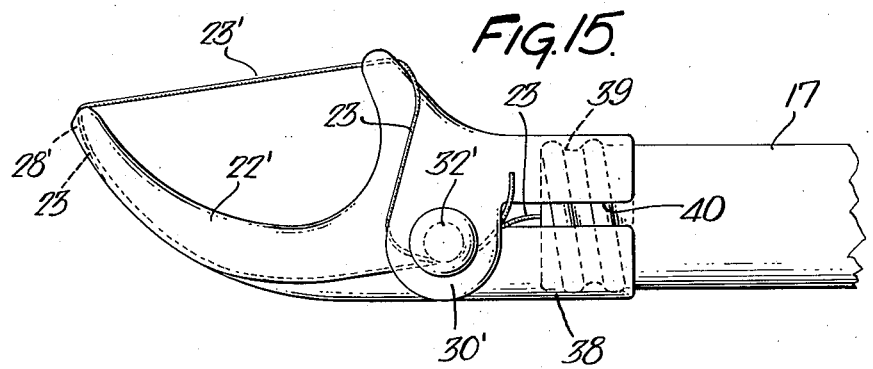
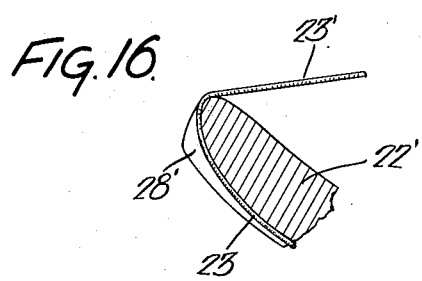
Inventors:
Charles E. Wright
Lionel A. Leicester
by their Attorneys
Howson & Howson Patented Dec. 4, 1951

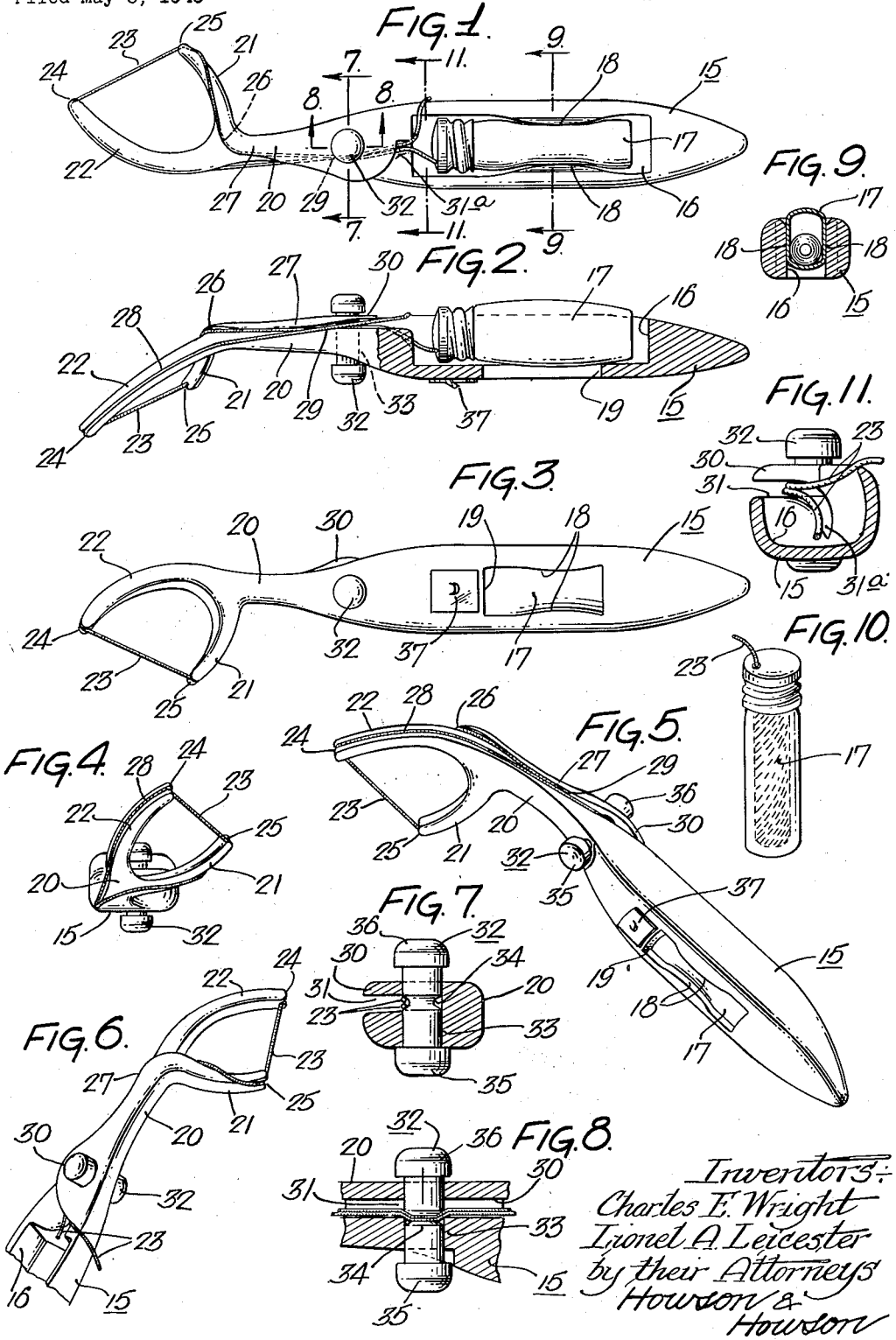

2,577,597

UNITED STATES PATENT OFFICE 2,577,597

DENTAL FLOSS HOLDER

Charles E. Wright and Lionel A. Leicester, Toronto, Ontario, Canada

Application May 3, 1948, Serial No. 24,775

7 Claims. (Cl. 132—91)

1

This invention relates to dental equipment and more particularly to an improved holder for dental floss.

We have found that a serious disadvantage in conventional holders for dental floss resides in the fact that the ability to reach all of the cavities between the teeth has been extremely limited due to the shape of the holder. Furthermore, the means for locking the dental floss in the holder has in many cases proved inadequate and renders these devices useless.

A primary object therefore of our invention is to provide a dental floss holder which supports the dental floss at an angle enabling maximum accessibility to all teeth.

A further object is to provide a dental floss holder having a simple, inexpensive but positive locking device for the dental floss.

A further object is to provide a dental floss holder adapted to utilize the conventional dental floss containers available on the market in such a way that the container may be quickly installed in the handle of the holder and the floss threaded on the prongs thereof with a minimum of effort.

A further object is to provide a modified form of dental floss holder in which the handle of the holder comprises the conventional dental floss receptacle as purchased on the market.

Further objects will be apparent from the specification and drawings in which:

Fig. 1 is a plan showing a dental floss holder constructed in accordance with the invention;

Fig. 2 is a side elevation partly sectioned of the structure of Fig. 1;

Fig. 3 is a bottom view of the structure of Fig. 1;

Fig. 4 is an end view of the structure of Fig. 1;

Fig. 5 is a perspective showing the grooves for guiding the dental floss;

Fig. 6 is a detail of one side of the prongs of the holder;

Fig. 7 is an enlarged section along the line 7—7 of Fig. 1 showing the locking plunger in the free position;

Fig. 8 is an enlarged section along the line 8—8 of Fig. 1 showing the locking plunger in the retaining position;

Fig. 9 is a sectional view as seen at 9—9 of Fig. 1;

Fig. 10 shows the conventional dental floss container which our holder is designed to utilize;

Fig. 11 is an enlarged section taken along the line 11—11 of Fig. 1;

Fig. 12 is a plan of a modified form of dental

2 floss holder in which the handle portion is shortened and internally threaded to receive the conventional dental floss receptacle;

Fig. 13 is a side elevation of the structure of Fig. 12;

Fig. 14 is a fragmentary section as seen at 14, 14 of Fig. 12;

Fig. 15 is an enlarged plan of the holder showing the manner of securing and positioning the dental floss; and Fig. 16 is an enlarged longitudinal sectional detail through the groove in the outermost prong of Fig. 15.

The invention comprises essentially the provision of a bifurcated prong formed integrally with a handle and set at such an angle to the handle that the user may conveniently reach all teeth with the length of dental floss stretched across the tips of the fork. Notches at the tips, together with grooves in the fork and the handle, eliminate the necessity for threading the floss through any eyes. A friction locking device in the handle securely clamps both lengths of floss and retains the floss in a taut condition across the fork tips. In the preferred form, the handle is recessed and provided with convex sides adapted to securely clamp the conventional plastic tubular container for dental floss. A modified form contemplates the use of the dental floss receptacle as the handle for the device. The floss holder terminates in a shortened boss which is recessed and internally threaded to accommodate the external threads on the dental floss receptacle. An axial slit enables the floss to be guided from the receptacle to its proper position in the holder grooves.

Referring now more particularly to the drawings, one embodiment of the dental floss holder has a hollow handle portion 15 having a rectangular recess 16 of slightly larger dimensions than the standard dental floss receptacle 17 (Fig. 10). Recess 16 has convex lateral sides 18, 18 past which the container 17 may be forced to securely retain it in recess 16 (Fig. 9). A smaller opening 19 in the bottom of recess 16 enables the container 17 to be readily ejected when replacement is necessary.

One end of handle 15 has an extended shank 20 which supports the prongs 21 and 22, forming a bifurcated or forked member adapted to position a length of dental floss 23. The longer prong 22 extends axially of body 15 as seen in plan and has a slight upward curve in this view. The base of shorter prong 21 is substantially at right angles to the axis of handle 15 and curves slightly toward prong 22 also when seen in plan of Fig. 1.

In side elevation (Fig. 2) prong 22 curves downwardly beginning at a point near the base of prong 21, whereas prong 21 likewise curves downwardly but at a sharper angle.

To summarize, the fork is of U configuration, the width of the U being substantially equal to its length. The base of the U is nearly semi-circular in shape and forms a smooth curved portion to which the shank 20 is attached tangentially and at an angle with respect to the plane of the prongs.

Fig. 4 illustrates the end view of the prongs and shows the floss 23 stretched tautly across the tips 24 and 25 of the prongs so that the length of floss 23 is positioned in biased relation to the axis of the handle. Since prong 22 is substantially longer than prong 21, the length 23 of the floss is biased with respect to all planes passing through the axis of the handle. The compound curves of the prongs in relation to the handle greatly facilitate the convenient use of the device and form an important part of the invention.

The tips 24 and 25 of prongs 21 and 22 are notched in order to retain the floss thereon and the prongs are grooved longitudinally as shown in Figs. 2 and 5 to retain the floss along the prongs. The groove 26 in prong 21 leads under a lip 27 (Fig. 5) and joins with the groove 28 in prong 22 at 29 in Fig. 5 from whence both strands of the floss are carried under a larger lip 30 which forms one side of a deep recess 31 (Fig. 7). The recess or groove 31 extends from the juncture of grooves 26 and 28, under lip 30, and terminates in a deep downwardly curved portion 31a as shown in Fig. 11.

Shank 20 carries the locking device for both strands of the floss which is constructed from a plunger 32 retained in a transverse bore 33 in shank 20. Plunger 32 has an annular groove 34 which in one extreme position of the plunger registers with recess 31. Enlarged heads 35 and 36 on plunger 32 serve as limit stops and as convenient operating knobs.

When the plunger 32 is in the unlocked position of Fig. 7, the strands of the dental floss register with groove 34 in the plunger and in this position the floss may be readily withdrawn from container 17 and positioned in the notches of the prongs. When it is desired to lock the floss, pressure is exerted on head 36 of plunger 32 which action securely wedges the floss between groove 34 and the walls of bore 33 as shown in Fig. 8. This locking action is extremely effective and it is not necessary that continued pressure be exerted on the plunger, since the locking action securely jams both lengths of floss in bore 33. Slight pressure on head 35 of the plunger 32 immediately releases the locking action, thus enabling a new length of floss to be positioned across the tips of the prongs. The configuration of groove 31 and especially the inner terminus 31a is such that the length of floss which leads from the container 17 is at all times retained in annular groove 34 of plunger 32 in order to insure positive locking when the plunger is depressed.

A cutting device 37 may be secured if desired, at any convenient position on the handle, as shown in Fig. 2.

Referring now more particularly to Figs. 12-16, a modified form of holder comprises a pair of prongs 21' and 22' which are substantially similar to prongs 21 and 22 except that prong 21' is somewhat shorter, thus making the line 23' of the floss more nearly parallel to the center line of the holder handle. Instead of the long shank 20, the locking device 32' is slightly in back of prong 21', thus enabling the overall dimensions of the holder to be substantially decreased. The operation of locking device 32' is identically the same as plunger 32 in Fig. 7 and the corresponding parts are similarly numbered. Instead of the handle portion 15 of the construction of Figs. 1-11, the holder terminates in a boss 38 which has internal threads 39. In the form of Fig. 12 the metallic cap on receptacle 17 is removed, whereupon the receptacle may be threaded into boss 38 which in effect serves as a cap for the receptacle. The dental floss is carried through an axial slit 40 in boss 38 and thence threaded against the groove 34' in plunger 32' in exactly the same manner as in Figs. 1-11.

In order to provide better access to the teeth, the tip of prong 22' is constructed as shown in Fig. 16 in which the groove 28' terminates short of the extremity of the prong as shown in Fig. 16. This construction positions the floss at the outermost portion of prong 22' yet at the same time the relatively wide flanges for groove 28' at the tip effectively prevents the floss from being forced from the tip of the prong. It is, of course, desirable that the dental floss be positioned at the very tip of prong 22' to facilitate insertion of the floss between the teeth.

It will be apparent that the modified form of Fig. 12 is intended primarily to be carried on the person or in a hand bag and is therefore designed to occupy the smallest possible space. The dental floss handle in either form, however, is adapted for use by dentists or by individuals for their own personal use. The thin compound curved fork is set at an angle enabling maximum accessibility and visibility in the mouth during use. Furthermore, the amount of floss required is much less than when the teeth are cleaned without a floss holder. The improved locking device is quickly operated and extremely secure.

We claim:

1. A dental floss holder having a handle, an elongated axially extending shank on said handle, and a U-shaped fork formed by a pair of curved prongs attached to said shank opposite the handle, the shank joining the fork at a point spaced from the mid-point of the U to form a long prong and a relatively shorter prong so that a line joining the tips of the prongs is biased with respect to the axis of the shank and the handle, and in which the plane of the U is biased with respect to the axis of the shank and handle.

2. A dental floss holder in accordance with claim 1, in which the shank is provided with a transversely operable plunger, walls in the shank defining a bore in which the plunger is manually reciprocable, longitudinal walls in the shank defining a grooved recess therein, walls around the periphery of said plunger defining a groove positioned in alignment with said groove in the shank when the plunger is moved to an unclamped position in the bore, whereby the dental floss is wedged between the bore and the plunger when the plunger is pushed axially to a clamping position in the bore.

3. A dental floss holder having a recessed handle adapted to receive a dental floss receptacle, means in said recessed handle for retaining the dental floss receptacle, a U-shaped fork, formed integrally with said handle and being connected thereto tangentially at the mid-point of said U, and the plane of the fork being biased with respect to the axis of the handle, grooves in the fork for guiding dental floss from the receptacle over the tips of the fork, and a plunger in the handle walls defining a bore in said handle, walls defining a longitudinal groove in said handle, walls around the periphery of said plunger in the bore, defining an annular groove therein, said grooves adapted to be selectively aligned with each other upon operation of the plunger, whereby dental floss may be wedged in the bore to retain the floss tightly in the fork and fork grooves when the plunger is displaced in the bore.

4. In a dental floss holder of the type having a handle, a supply of dental floss associated with said handle and a U-shaped fork comprising a pair of prongs across which a length of dental floss is tautly positioned when cleaning teeth, the improvement that consists of a plunger reciprocable in the handle, walls defining a bore in the handle in which the plunger is manually movable, walls around the periphery of said plunger defining an annular groove therein, walls in said handle defining a groove communicating with said bore, said grooves adapted to be selectively aligned with each other upon operation of the plunger in the bore, whereby dental floss may be wedged in the bore to retain the floss tightly in the fork when the plunger is pushed to a clamping position in the bore.

5. A dental floss holder in accordance with claim 1 having notches at the tips of the prongs, and a groove extending longitudinally along the outer edge of at least one of said prongs to receive a length of dental floss.

6. A dental floss holder in accordance with claim 1 having grooves extending longitudinally along the outer faces of the prongs to receive a length of dental floss, at least one of said grooves terminating short of the extremity of the prong to guide the floss over said extremity.

7. A dental floss holder in accordance with claim 1 in which the handle comprises a recessed internally threaded boss on the holder and a dental floss receptacle threaded into said boss.

CHARLES E. WRIGHT.
LIONEL A. LEICESTER.

REFERENCES CITED

The following references are of record in the file of this patent:

UNITED STATES PATENTS

| Number | Name | Date |
| --- | --- | --- |
| 1,205,732 | Groetchen | Nov. 21, 1916 |
| 1,368,555 | Henerlau | Feb. 15, 1921 |
| 1,386,806 | Schmerler | Aug. 9, 1921 |
| 1,442,380 | Ball | Jan. 16, 1923 |
| 1,464,013 | Roberts | Aug. 7, 1923 |
| 1,468,942 | Gamble | Sept. 25, 1923 |
| 1,700,550 | Stafford | Jan. 29, 1929 |
| 1,833,671 | Byars | Nov. 24, 1931 |
| 2,098,610 | Bluhm | Nov. 9, 1937 |
| 2,460,591 | Luzar | Feb. 1, 1949 |